US012566127B2

(12) United States Patent
Mermet et al.

(10) Patent No.: US 12,566,127 B2
(45) Date of Patent: Mar. 3, 2026

(54) LENSLESS IMAGING DEVICE

(71) Applicant: COMMISSARIAT A L'ENERGIE ATOMIQUE ET AUX ENERGIES ALTERNATIVES, Paris (FR)

(72) Inventors: Xavier Mermet, Grenoble (FR); Caroline Paulus, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 152 days.

(21) Appl. No.: 18/354,947

(22) Filed: Jul. 19, 2023

(65) Prior Publication Data

US 2024/0027329 A1 Jan. 25, 2024

(30) Foreign Application Priority Data

Jul. 19, 2022 (FR) ..................................... 22 07366

(51) Int. Cl.
*G01N 21/03* (2006.01)

(52) U.S. Cl.
CPC ... *G01N 21/0303* (2013.01); *G01N 2201/024* (2013.01); *G01N 2201/0612* (2013.01)

(58) Field of Classification Search
CPC .......... G01N 15/1434; G01N 21/0303; G01N 2201/022; G01N 2201/024; G01N 2201/06113; G01N 2201/0612; G02B 21/0008
USPC ........................................................ 356/432
See application file for complete search history.

(56) References Cited

U.S. PATENT DOCUMENTS

| | | | | |
|---|---|---|---|---|
| 6,020,963 A | * | 2/2000 | DiMarzio | .......... G01N 21/4795 |
| | | | | 356/491 |
| 2005/0006596 A1 | | 1/2005 | Kanai | |
| 2013/0120760 A1 | * | 5/2013 | Raguin | .................. A61B 5/117 |
| | | | | 356/612 |
| 2013/0323757 A1 | | 12/2013 | Poher et al. | |
| 2016/0160174 A1 | * | 6/2016 | Allier | .................. G01N 21/453 |
| | | | | 435/288.7 |
| 2016/0299158 A1 | | 10/2016 | Poher et al. | |

FOREIGN PATENT DOCUMENTS

| | | | |
|---|---|---|---|
| EP | 1 496 349 A1 | | 1/2005 |
| EP | 2 669 678 A1 | | 12/2013 |
| WO | WO 2021/239536 A1 | | 12/2021 |

OTHER PUBLICATIONS

French Preliminary Search Report issued Mar. 1, 2023 in French Application 22 07366 filed on Jul. 19, 2022 citing documents 1-3, 15-17 therein, 11 pages (with English Translation of Categories of Cited Documents and Written Opinion).

* cited by examiner

*Primary Examiner* — Sunghee Y Gray

(74) *Attorney, Agent, or Firm* — Oblon, McClelland, Maier & Neustadt, L.L.P.

(57) ABSTRACT

The invention relates to a lensless imaging device, comprising
an emitting part comprising a light source (1) configured to emit a light beam in a direction of emission and intended to follow an optical path,
a receiving part incorporating an electronic circuit board (3) bearing a sensor (2) having a planar capture surface (20) intended to receive said light beam in a direction normal to said capture surface,
said optical path being subdivided into several successive optical sections, each optical section corresponding to a distinct direction of propagation of the light beam.

9 Claims, 3 Drawing Sheets

LENSLESS IMAGING DEVICE

TECHNICAL FIELD OF THE INVENTION

The present invention relates to a lensless imaging device. The device offers the particular feature of being particularly compact.

STATE OF THE ART

The principle of lensless imaging is employed to observe samples, notably biological samples. This technique makes it possible to observe a sample (for example placed on a transparent plate, a petri dish) by disposing it between a light source and an image sensor, without arranging any image-forming lens between the sample and the sensor. The image sensor collects an image of a light wave diffracted by the sample. Lensless imaging is a simple and inexpensive alternative to a conventional microscope. The patent application WO2013/178777A1 describes such a device and its principle of operation.

For a lensless imaging device to be effective, the path travelled by the light between the source and the sensor must be sufficiently long. Conventionally, the light source is placed above the sensor so as to emit a beam oriented at right angles to the surface of the sensor. To obtain this optical path of sufficient length in order to ensure the spatial coherence of the wave, the height of the source is adapted with respect to the sensor. This constraint generates a significant bulk in terms of height and impacts the compactness of the device.

Other solutions are described in the patent applications WO2021/239536A1 and EP1496349A1.

The aim of the invention is to propose a lensless imaging device which proves to be particularly compact and easy to transport and manipulate, while remaining effective and efficient.

SUMMARY OF THE INVENTION

This aim is achieved by a lensless imaging device, comprising:
  an emitting part comprising a light source configured to emit a light beam in a direction of emission and intended to follow an optical path,
  a receiving part incorporating an electronic circuit board bearing a sensor having a planar capture surface intended to receive said light beam in a direction normal to said capture surface,
  said optical path being subdivided into several successive optical sections, each optical section corresponding to a distinct direction of propagation of the light beam,
characterized in that:
  the first optical section of the optical path starts from the light source to a first optical element,
  the last optical section of the optical path starts from a last optical element and is oriented in a direction normal to the capture surface of the sensor,
  the optical path comprises at least two successive optical sections of the optical path which are situated in a plane parallel to the capture surface of the sensor.

According to a particular feature, the electronic circuit board comprises a first section delimited in a plane and the emitting part is housed in a housing having a second section less than or equal to said first section.

According to another particular feature, each optical element is composed of a reflector.

According to another particular feature, each reflector is configured and oriented to receive said light beam in a first direction and redirect it in a second direction symmetrical to this first direction with respect to the normal to the plane of the reflector.

According to another particular feature, the sensor is of CMOS type.

According to another particular feature, the device is incorporated in a one-piece housing.

According to another particular feature, the one-piece housing comprises:
  a high part incorporating the emitting part,
  a low part incorporating the receiving part,
  a link part between the high part and the low part arranged to define a non-zero space between said high part and the low part, said space being formed to accommodate a sample viewing chamber.

According to another particular feature, the low part of the housing comprises a recess in which said electronic circuit board is embedded.

According to another particular feature, the one-piece housing is produced by the assembly of several modules together, each module being configured to form a distinct optical section of the optical path.

BRIEF DESCRIPTION OF THE FIGURES

Other features and advantages will emerge from the following detailed description given in light of the attached drawings in which.

DETAILED DESCRIPTION OF AT LEAST ONE EMBODIMENT

Figure 1:
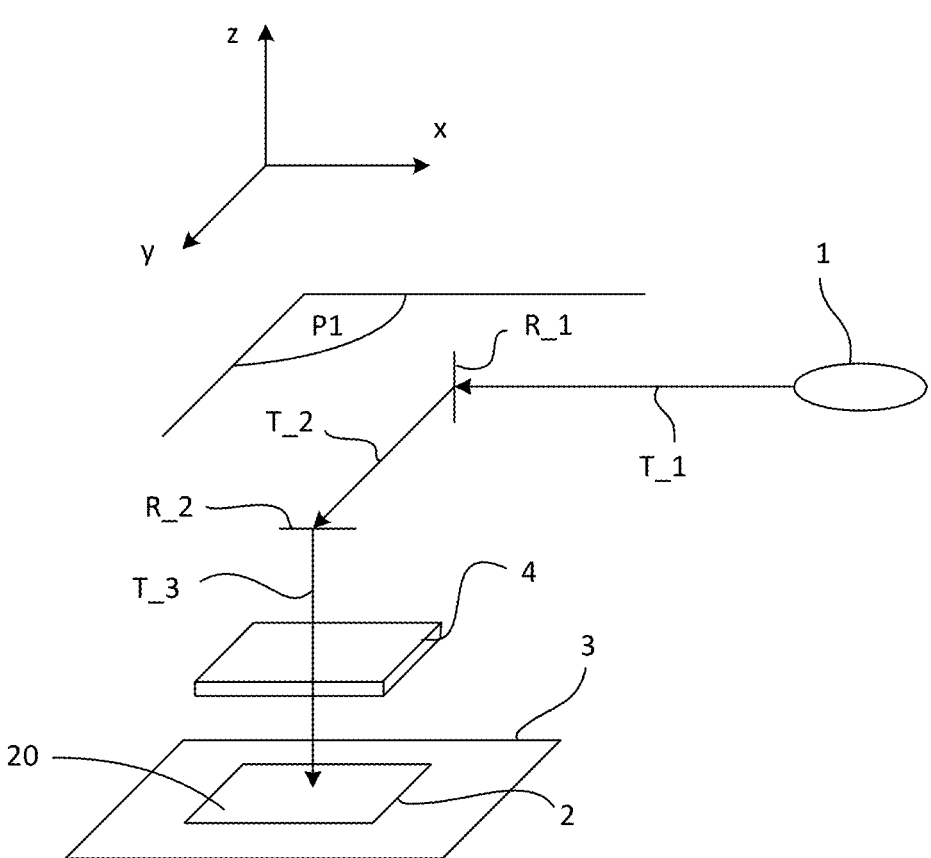
FIG. 1 schematically shows a first embodiment of the device of the invention and illustrates its principle of operation.

Hereinafter in the description, an orthonormal reference frame X, Y, Z is defined as represented in the attached figures.

Hereinafter in the description, the terms "high", "low", "above", "below" are to be considered with respect to the vertical direction Z oriented upwards.

Hereinafter in the description, the terms "upstream" and "downstream" are to be considered by taking account of the direction of propagation of the light beam.

According to the invention, the device operates according to the principle of lensless imaging.

In the present description, the expression "lensless" to characterize the imaging principle used by the device means that the device does not include optical elements in the form of lenses on the path of the light beam between the light source and the sensor.

The device therefore comprises means for emitting a light beam.

The emission means comprise a light source 1.

The light source 1 is a spatially and temporally coherent or semi-coherent source. The light source 1 is for example chosen from among a laser, a laser diode, a laser diode of VCSEL type, or one or more light-emitting diodes associated with a "pinhole".

The light source 1, seen by the sample, is considered to be a spot. That means that its diameter (or its diagonal) is preferentially less than a tenth, better than a hundredth, of the distance between the sample and the light source. Thus, preferably, the light arrives at the sample in the form of flat waves, or waves that can be considered as such.

The device also comprises a sensor 2, such as a sensor of pixelated images, in two dimensions. The sensor 2 is designed to acquire images of the light radiation transmitted by the viewing chamber illuminated by the light beam.

It can notably be a sensor of CCD ("Charge Coupled Device") or CMOS (for "Complementary Metal Oxide Semi-Conductor") type.

The sensor 2 is for example capable of generating at least one image every 5 seconds, and the acquisition rate is therefore greater than 0.2 Hz. It preferably lies between 1 Hz and 100 Hz.

The sensor 2 is for example mounted on an electronic circuit board 3. It comprises a capture surface 20 that is planar in two dimensions (on X and Y). Its capture surface 20 corresponds to the surface receiving the radiation transmitted by the viewing chamber.

The electronic circuit board 3 advantageously comprises processing means such as a microcontroller, configured to process the diffraction images received by the sensor 2. It can comprise a communication interface, wired or wireless, for sending data to a remote terminal (smartphone, computer, etc.). It can also have a connection system suitable for connecting a human-machine interface (buttons, touchscreen or the like) to it.

The sample can be a biological sample that is wanted to be characterized. The sample is disposed between the light source 1 and the image sensor 2, ideally at a maximum distance of 2 mm from the sensor.

The sample to be analysed is placed in a viewing chamber 4, which can, for example, be a transparent plate or a petri dish, also transparent. The term "transparent" is understood to mean that the viewing chamber 4 allows enough of the light beam to pass for the sensor to be able to pick up most of the radiation transmitted through the chamber.

According to the invention, the optical path followed by the light beam between the light source and the sensor is subdivided into several successive optical sections $T\_i$ (with i ranging from 1 to N and N greater than or equal to 3).

The first optical section $T\_1$ of the optical path starts from the light source 1 to a first optical element $R\_1$.

The last optical section $T\_N$ of the optical path starts from a last optical element $R\_N{-}1$ and passes through the viewing chamber 4 to the sensor 2. This last optical section $T\_N$ follows a direction along the axis Z, so as to pass through the viewing chamber 4 and come to the sensor in a direction normal to the capture surface 20 of the sensor 2 (which is produced on X, Y).

Between the first optical section $T\_1$ and the last optical section $T\_N$, the device comprises at least one additional optical section, produced between two optical elements. It can notably be an optical section produced between the first optical element $R\_1$ and the last optical element $R\_N{-}1$ described above.

According to the invention, the optical path comprises at least two successive optical sections situated in a plane parallel to the capture surface 20 of the sensor.

In a nonlimiting manner, each reflector $R\_i$ is, for example, a mirror configured to receive a light beam in a first direction and to return this beam in a second direction symmetrical to this first direction (and distinct therefrom) with respect to the normal to the plane of the mirror, and in a simplified way in a second direction at right angles to the first direction if this first direction has an angle of incidence on the mirror of 45°.

In a nonlimiting manner, the device has an architecture in which the emitting part (light source+reflector(s)) is housed in a single first housing, produced in a single piece. The receiving part (electronic circuit board with sensor) can be placed in an independent housing fixed to said first housing or directly incorporated in said first housing (see description hereinbelow in association with FIG. 3).

Starting from these principles, several embodiments can be envisaged. To adapt to these constraints, the device thus comprises several reflectors making it possible to divide up the optical path into several successive optical sections.

Referring to FIG. 1, according to a simplified first embodiment, the optical path comprises three optical sections. This first embodiment consists in positioning the light source 1 so as to emit in a plane P1 parallel to that defined by the axes X and Y. The first optical section therefore follows a first direction on Y in the plane P1. The first reflector $R\_1$ receives the beam originating from the light source 1 and is oriented to direct it in a second direction, distinct from the first direction, still situated in the plane P1, for example on X. The second optical section $T\_2$ therefore goes from the first reflector $R\_1$ to the second reflector $R\_2$. The second reflector $R\_2$ is oriented to direct the beam to the sensor 2, so as to form the last optical section $T\_3$ of the path, on Z. This first embodiment thus uses only two optical elements of reflector type.

Figure 2:
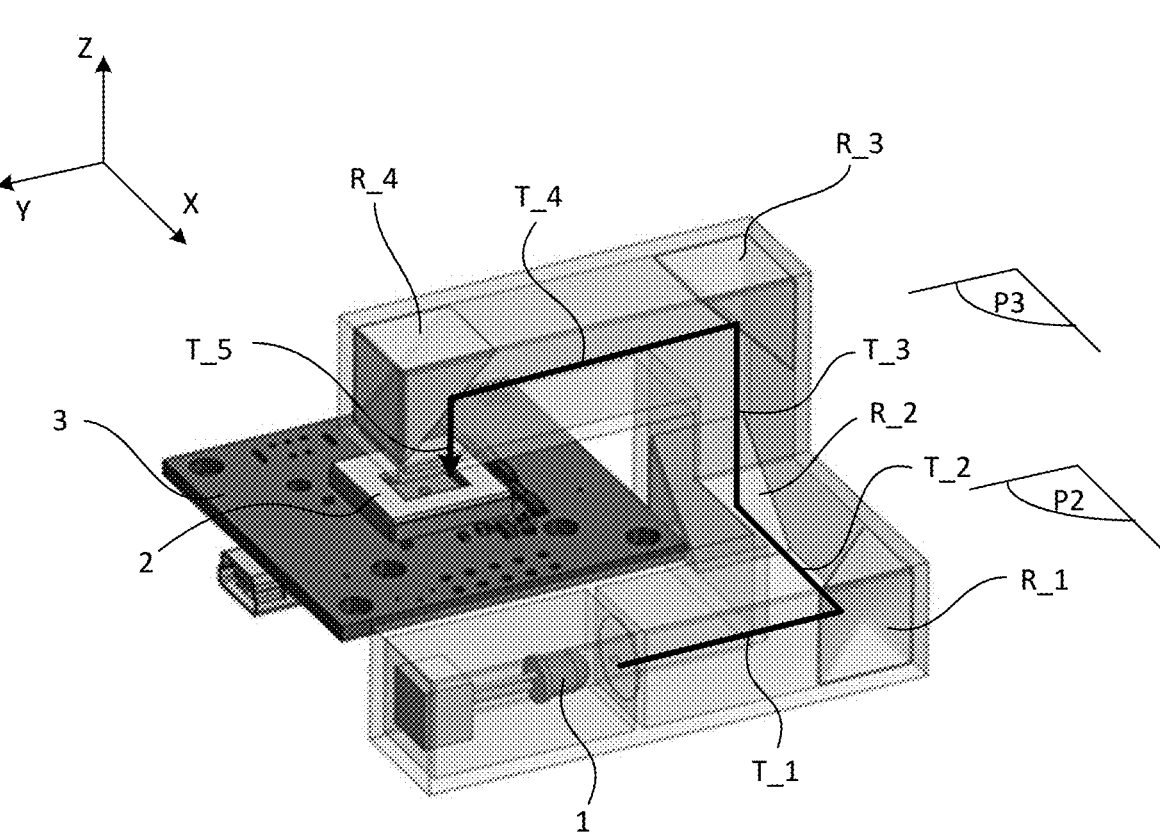
FIG. 2 represents a second embodiment of the device of the invention.

Referring to FIG. 2, a second variant embodiment uses four optical elements of reflector type.

The first optical section $T\_1$ going from the light source 1 to the first reflector $R\_1$ follows a first direction on Y in a plane P2 parallel to the capture surface. The first reflector $R\_1$ is oriented so as to send the beam in a second direction, for example on X, thus forming the second optical section $T\_2$ towards the second reflector $R\_2$. The second reflector $R\_2$ is oriented to direct the beam on Z, to a third reflector R-3, forming the third optical section $T\_3$. The third reflector $R\_3$ is oriented to direct the light beam in a direction on Y situated in another plane P3, parallel to P2, distinct therefrom and situated above the plane P2 and the capture surface 20, forming a fourth optical section $T\_4$. A last reflector $R\_4$ is oriented to form the last optical section $T\_5$ on Z, normal to the capture surface 20.

Figure 3:
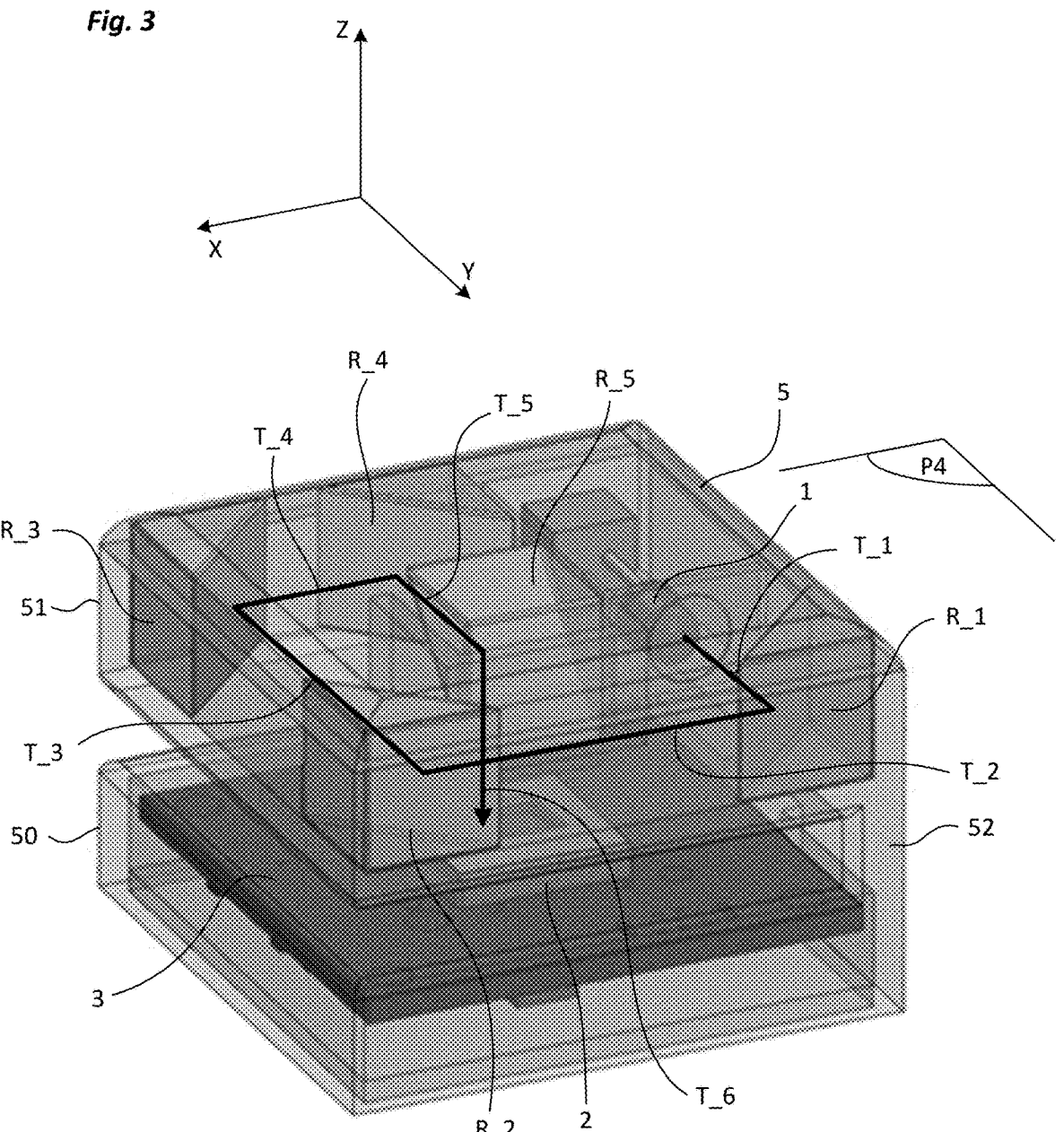
FIG. 3 represents a preferred embodiment of the device of the invention.

An advantageous variant is described in FIG. 3. According to this variant, the bulk of the device in the plane defined by the axes X and Y is defined by the size of the electronic circuit board 3 bearing the sensor 2. Moreover, the device can be produced according to an entirely one-piece architecture, with a single housing 5 incorporating the emitting part and the receiving part.

As an example, in FIG. 3, the electronic circuit board 3 has a rectangular form and is incorporated in a low part 50 of the housing, this low part accommodating the electronic circuit board by embedment. A high part 51 of the housing incorporates the emitting part of the device. It houses the light source and several reflectors. The zone situated between the low part of the housing and the high part of the housing corresponds to a zone for accommodating the sample (for example in the form of a transparent plate or a petri dish).

In this variant, the device has five reflectors. The light source 1 is oriented to emit in a first direction, for example on Y, forming the first optical section $T\_1$. The first reflector $R\_1$ is oriented to redirect the beam in the same plane P4, on X, forming the second optical section $T\_2$. The second reflector R_2 receives the beam and is oriented to redirect it once again on Y, forming the third optical section T_3 parallel to the first optical section. The third reflector R_3 is oriented to redirect the beam on X, forming the fourth optical section T_4, parallel to the second optical section. The fourth reflector R_4 is oriented to redirect the beam on Y, forming the fifth optical section T_5 parallel to the first optical section. The last reflector R_5 is oriented to redirect the beam on Z to the viewing chamber 4 and at right angles to the capture surface 20 of the sensor 2. In this architecture, in the emitting part, upstream of the last optical section, the beam remains in a same plane parallel to the capture surface 20 and thus follows a snail-like trajectory.

The low part 50 of the housing 5 and the high part 51 of the housing 5 can be linked by a link part 52, defining the length of the last optical section T_5. In this variant embodiment, it would be possible to provide height adjustment means, for adjusting the separation between the emitting part and the receiving part and thus set the length of the last optical section. This height adjustment would make it possible both to adjust the total length of the optical path and be able to adapt the height of the zone accommodating the sample situated between the two parts 50, 51 of the housing.

From the light source 1 to the viewing chamber 4, the optical path is advantageously of a first length of between 1 cm and 30 cm, for example 8 cm.

From the viewing chamber to the sensor, the optical path is of a second length, advantageously less than 1 cm, preferably lying between 100 μm and 2 mm. Giving preference to a short distance between the viewing chamber 4 and the sensor 2 makes it possible to limit interference phenomena between the diffraction figures. Indeed, when this distance increases, such interference is likely to render the image unusable, notably when the number of particles present in the sample being analysed increases.

Advantageously, the solution of the invention can be produced in a modular way. As an example, each optical section T_i can be embodied by a distinct module, the modules being assembled together to form the architecture of the device. Similarly, the receiving part can be a distinct module. Assembly means can be provided to assemble the modules together. Each module thus incorporates one or two reflectors.

The solution of the invention thus offers numerous advantages. The final device proves to be particularly compact.

The invention claimed is:

1. A lensless imaging device, comprising:
an emitting part comprising a light source configured to emit a light beam in a direction of emission and configured to follow an optical path, a receiving part incorporating an electronic circuit board bearing a sensor having a planar capture surface configured to receive that said light beam in a direction normal to said capture surface,
said optical path being subdivided into several successive optical sections, each optical section corresponding to a distinct axis of propagation of the light beam,
wherein:
the first optical section (T_1) of the optical path starts from the light source to a first optical element,
the last optical section (T_N) of the optical path starts from a last optical element and is oriented in a direction normal to the capture surface of the sensor,
the optical path comprises, among the several successive optical sections, at least two successive optical sections which are of distinct axis and which are situated in a plane parallel to the capture surface of the sensor.

2. The device according to claim 1, wherein the electronic circuit board comprises a first section delimited in a plane and the emitting part is housed in a housing having a second section.

3. The device according to claim 1, wherein each optical element is composed of a reflector.

4. The device according to claim 3, wherein each reflector is configured and oriented to receive said light beam in a first direction and redirect it in a second direction symmetrical to this first direction with respect to the normal to the plane of the reflector.

5. The device according to claim 1, wherein the sensor is of CMOS type.

6. The device according to claim 1, wherein the device is incorporated in a one-piece housing.

7. The device according to claim 6, wherein the one-piece housing comprises:
a high part incorporating the emitting part,
a low part incorporating the receiving part,
a link part between the high part and the low part arranged to define a space between said high part and the low part, said space being formed to accommodate a sample viewing chamber.

8. The device according to claim 7, wherein the low part of the housing comprises a recess in which said electronic circuit board is embedded.

9. The device according to claim 6, wherein the one-piece housing is produced by the assembly of several modules together, each module being configured to form a distinct optical section of the optical path.

\* \* \* \* \*